(12) United States Patent
Criddle et al.

(10) Patent No.: US 7,889,715 B2
(45) Date of Patent: Feb. 15, 2011

(54) VOICE OVER INTERNET PROTOCOL (VOIP) MANAGEMENT

(75) Inventors: Linda Criddle, Redmond, WA (US); David Milstein, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1253 days.

(21) Appl. No.: 11/216,627

(22) Filed: Aug. 31, 2005

(65) Prior Publication Data

US 2007/0047533 A1 Mar. 1, 2007

(51) Int. Cl.
 *H04L 12/66* (2006.01)
(52) U.S. Cl. ..................... 370/352; 370/353
(58) Field of Classification Search ............ 370/353, 370/352; 455/411, 418, 410; 379/142.05
 See application file for complete search history.

(56) References Cited

U.S. PATENT DOCUMENTS

| | | | |
|---|---|---|---|
| 5,555,376 | A | 9/1996 | Theimer et al. |
| 5,889,958 | A | 3/1999 | Willens |
| 5,911,043 | A | 6/1999 | Duffy et al. |
| 5,987,611 | A | 11/1999 | Freund |
| 6,014,437 | A | 1/2000 | Acker et al. |
| 6,044,465 | A | 3/2000 | Dutcher et al. |
| 6,343,119 | B1 | 1/2002 | Creamer et al. |
| 6,581,094 | B1 | 6/2003 | Gao |
| 6,697,357 | B2 | 2/2004 | Emerson, III |
| 6,882,709 | B1 | 4/2005 | Sherlock et al. |
| 7,020,704 | B1 | 3/2006 | Lipscomb et al. |
| 7,099,938 | B2 | 8/2006 | Hermann et al. |
| 7,269,664 | B2 | 9/2007 | Hutsch et al. |
| 2003/0076941 | A1 | 4/2003 | Tiliks |
| 2003/0108172 | A1 | 6/2003 | Petty |
| 2003/0112930 | A1 | 6/2003 | Bosik et al. |
| 2003/0215078 | A1 | 11/2003 | Brahm et al. |
| 2004/0180646 | A1* | 9/2004 | Donley et al. ............. 455/411 |
| 2004/0261115 | A1 | 12/2004 | Bartfeld |
| 2005/0041787 | A1 | 2/2005 | Casey |
| 2005/0130641 | A1* | 6/2005 | Scott et al. ............ 455/418 |
| 2006/0268828 | A1* | 11/2006 | Yarlagadda ............ 370/352 |

FOREIGN PATENT DOCUMENTS

| | | |
|---|---|---|
| CA | 2342752 | 10/2001 |
| CN | 1455554 (A) | 11/2003 |
| EP | 1422909 (A2) | 5/2004 |
| GB | 2389737 | 12/2003 |
| WO | WO0042760(A1) | 7/2000 |
| WO | WO0120859 | 3/2001 |
| WO | WO0195063 | 12/2001 |
| WO | WO0198934 | 12/2001 |

OTHER PUBLICATIONS

"Your Phone Line Will Never Be Busy; Internet Call Manger gives you all this", Available at http://homel.gte.net/sekim/callmgr/, accessed Aug. 23, 2005, 7 pages.

"Netmop: Total Family Protection", Available at http://www.netmop.com/learn-more.html, accessed Aug. 23, 2005, 2 pages.

(Continued)

*Primary Examiner*—Thjuan K Addy
(74) *Attorney, Agent, or Firm*—Lee & Hayes, PLLC

(57) ABSTRACT

Techniques are described herein which are operable to manage Voice over Internet Protocol (VoIP) communication.

16 Claims, 6 Drawing Sheets

OTHER PUBLICATIONS

"Cyberpatrol", Available at http://www.cyberpatrol.com/Defaultaspx?id=119&mnuid=2, accessed Aug. 23, 2005, 1 page.

"Spy-Reviews.com; Internet Monitoring & Surveillance Products", Available at http://www.spy-reviews.com/home-spyreviews.asp?refere=25044, accessed Aug. 23, 2005, 3 pages.

"Spy-Reviews.com; Internet Monitoring and Surveillance Products", http://www.spy-reviews.com/home-spyreviews.asp?refere=25044, accessed Aug. 23, 2005, xx pages.

* cited by examiner

VOICE OVER INTERNET PROTOCOL (VOIP) MANAGEMENT

BACKGROUND

Users have communicated through the user of traditional telephone services, also known as a Plain Old Telephone Service (POTS), for many years. Therefore, users are familiar with and have become accustomed to particular techniques when communicating using traditional telephone services, such as when dialing numbers, call forwarding, and so on.

One technique that is gaining in popularity to provide telephone services is commonly referred to as "VoIP", which is an acronym for Voice over Internet Protocol. VoIP is typically performed using the Internet such that users may communicate, one to another, as they would during a typical telephone call. However, because users have a long-standing familiarity with traditional telephone services, providers of VoIP typically provide these services in a manner that mimics a traditional telephone service. Therefore, a user of these traditional telephone services, although provided with a familiar "look and feel", is not provided with additional functionality that may be made available through VoIP.

SUMMARY

Voice over Internet Protocol (VoIP) management techniques are described. In one or more embodiments, the management techniques are implemented through the use of software to provide a wide variety of functionality to VoIP communication. The management techniques, for instance, may provide family safety and privacy measures to manage how VoIP calls are routed for particular members of a family.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Traditional telephone communication techniques offer limited functionality to users. For example, family safety and privacy measures are not offered in fixed-line phone connectivity today. Parents, for instance, are not currently able to control who is permitted to contact their children, when such contact is permitted (if at all), and so on.

In a variety of implementations, techniques are described that are operable to manage Voice over Internet Protocol (VoIP) communication. A variety of different management techniques may be employed to provide a wide variety of functionality. For instance, a technique may employ a profile which specifies security settings of user, such as particular users that are permitted to contact the user, routing of VoIP communications from particular users, and so on. The VoIP communication to the user may then be managed based on the profile before the VoIP communication is received by the user. For instance, a VoIP provider may manage the communication based on the profile before the communication is delivered to an intended recipient, further discussion of which may be found in relation to FIG. 3.

In another instance, the profile may be utilized to manage a variety of communication techniques, at least one of which includes VoIP communication. For example, the profile may be utilized to manage VoIP communication as well as email, instant messaging, and so on. Thus, a parent may specify a profile for a child that addresses each network communication technique that is likely to be employed by the child. Further discussion of management of a variety of communication techniques may be found in relation to FIG. 4.

In a further instance, a third-party verifier may be employed to verify the VoIP communication. For instance, a VoIP communication from a sender that is not specified in a profile may first be routed to a parent for verification. In another instance, an authentication service may be employed, such as through use of an executable module that automatically queries an originator of the VoIP communication, further discussion of which may be found in relation to FIG. 5.

In the following discussion, an exemplary environment is first described which is operable to provide VoIP management. Exemplary procedures are then described which may be employed in the exemplary environment, as well as in other environments.

Exemplary Environment

Figure 1:
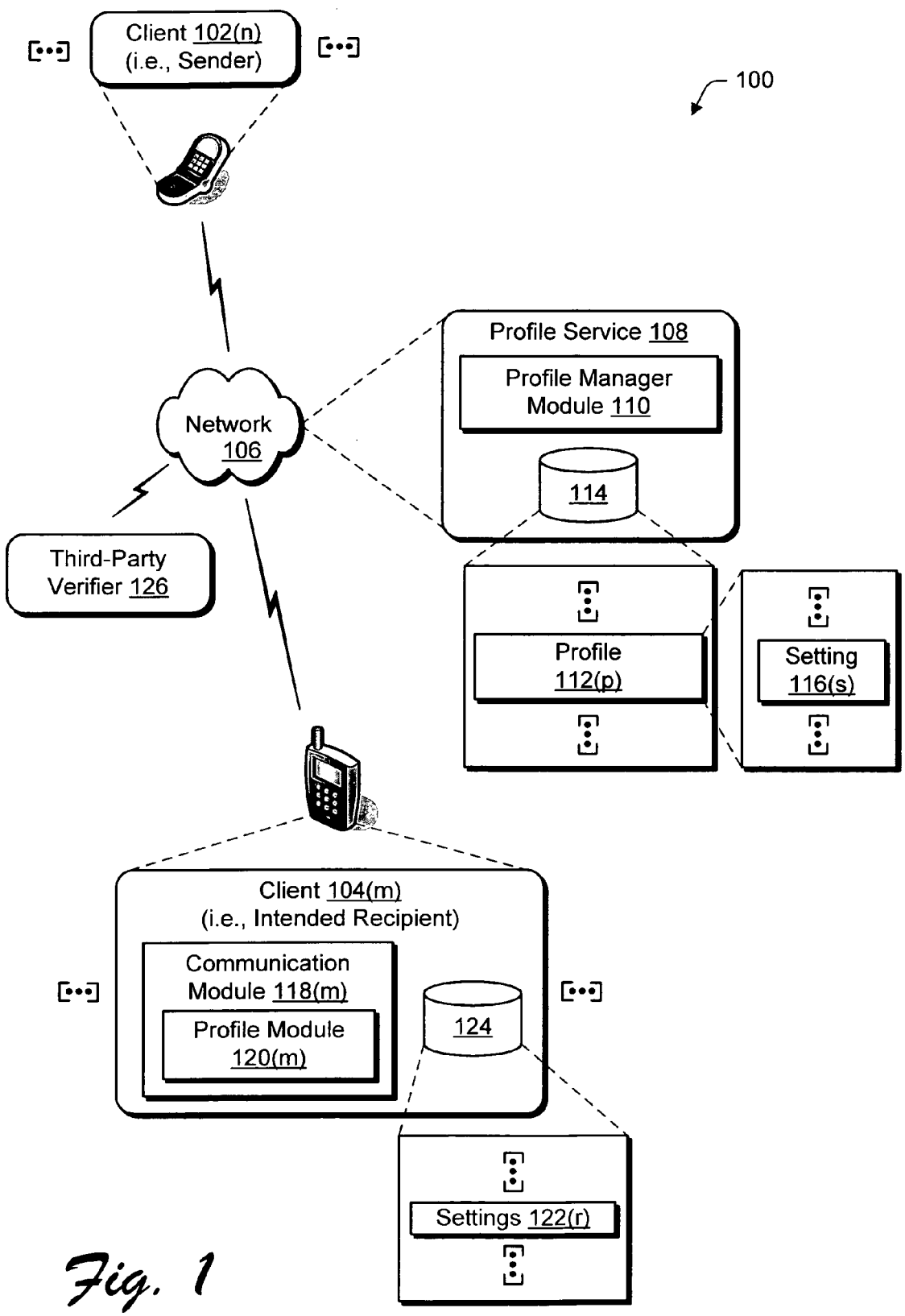
FIG. 1 is an illustration of an environment in an exemplary implementation that is operable to employ techniques for managing VoIP communication.

FIG. 1 illustrates an environment 100 in an exemplary implementation that is operable to employ techniques for managing VoIP communication. The illustrated environment 100 includes pluralities of clients 102(n), 104(m) (where "n" and "M" can be any integer from one to "N" and "M", respectively) that are communicatively coupled, one to another, via a network 106. The clients 102(n), 104(m) may be configured in a variety of ways for communicating via the network 106. For example, one or more of the clients 102(n), 104(m) may be configured as VoIP phones (e.g., wired or wireless) as illustrated, a computing device, such as a desktop computer, a mobile station, an entertainment appliance, a set-top box communicatively coupled to a display device, a game console, and so forth. Thus, the clients 102(n), 104(m) may range from full resource devices with substantial memory and processor resources (e.g., current wireless phones, PDAs) to low-resource devices with limited memory and/or processing resources (e.g., legacy wireless phones, hand-held game consoles). The clients 102(n), 104(m) may also relate to a person and/or entity that operate the clients. In other words, for purposes of the following discussion one or more of the clients 102(n), 104(m) may describe logical clients that include users, software, and/or devices.

Although the network 106 is illustrated as the Internet, the network may assume a wide variety of configurations. For example, the network 106 may include portions configured as a wide area network (WAN), a local area network (LAN), a wireless network, a public telephone network, an intranet, and so on. Thus, although a single network 106 is shown, the network 106 may be configured to include multiple networks.

In the illustrated environment, the clients 102(n), 104(m) communicate, one to another, over the network 106 using VoIP communication techniques. VoIP communication techniques employ packets to send voice communications over the network 106 between the clients 102(n), 104(m). For example, a sender (e.g., client 102(n)) may be configured to convert an analog signal to digital data which is then transmitted over the network 106 via a plurality of packets, which includes the digital data, to an intended recipient, i.e., client 104(m). Client 104(m) may be configured to arrange the received packets and convert the digital data in the received packets into an analog signal that is output at the client 104(m). Likewise, VoIP communication may be performed back from client 104(m) to client 102(n) using packets such that the clients 102(n), 104(m) may participate in a spoken conversation. Thus, the digital data is provided as a payload in the packets, each of which includes an address, to which, the packet is to be communicated.

The environment 100 is illustrated as including a profile service 108 that is configured to manage VoIP communication between the clients 102(n), 104(m), and thus is depicted "within" the network 106 and "between" the clients 102(n), 104(m). The profile service 108 includes a profile manager module 110 which is representative of functionality that is executable to create and manage a plurality of profiles 112(p) (where "p" can be any integer from one to "P") which are illustrated as stored in storage 114.

Each of the profiles 112(p) corresponds to one of the plurality of clients 102(n), 104(m) and includes respective settings 116(s), where "s" can be any integer from one to "S", related to communication techniques for the corresponding one of the clients 102(n), 104(m). For example, client 104(m) may have a corresponding profile 112(p) which includes security and configuration settings 116(s) that specify which of the plurality of clients 102(n) are permitted to communicate with the client 104(m), when such communication is permitted, which communication techniques may be utilized to communicate with the client 104(m) (e.g., email, instant messaging, VoIP, bulletin boards, blogs, and so forth), settings for each of the communication techniques (e.g., HTML for email, version supported for instant messaging), and so on. For instance, the profile 112(p) may be configured as a contact list and include indications of whether communication with particular contacts is permitted. The profile manager module 110 may then manage communication with the client 104(m) using the respective profiles 112(p).

A variety of different techniques may be employed to manage VoIP and other communication over the network 106 between the clients 102(n), 104(m). For example, a parent may interact via a communication module 118(m) (e.g., configured as a web browser, instant messaging module, and so on) with the profile manager module 110 to create a profile 112(p) for a particular child. The profile 112(p), when created, may then include settings 116(s) which specify permissible and/or impermissible communication with the child, such as which clients 102(n) are or are not permitted to communicate with the child, when such communication is or is not permitted, and so on. The profile manager module 110 may then utilize the created profile 112(p) to manage communication even before such communication is received by the intended recipient, e.g., the child in this example. For instance, the profile manager module 110 may block a communication having an indication (e.g., an identifier in a header of the packet) as being sent from one of the clients 102(n) that are not permitted to communicate with the child before the communication is delivered to the client 104(m).

In another example, the profile 112(p) may be configured to "roam" with the corresponding user. For example, the child may utilize a wide variety of client devices to communicate via the network 106 as previously described, such as a wireless phone, PDA, desktop computer, and so on. Therefore, the profile service 108 may be configured to utilize the profile 112(p) regardless of which client device is being used by the child. For instance, the communication module 118(m) may include a profile module 120(m) that is configured to communicate with the profile service 108 over the network 106 to obtain settings 116(s) from a profile 112(p) that corresponds to the child. These settings 116(s) may be communicated over the network 106 and stored locally on the client 104(m) as setting 122(r) (where "r" can be any integer from one to "R") in local storage 124. In another instance, the settings 116(s) "remain" at the profile service 108 and the communication is managed as previously described such that the client 104(m) does not need to receive the communication before management is provided. In such an instance, the child may "logon" to the profile service 108 before communication with the plurality of clients 102(n) is permitted. A variety of other instances are also contemplated, further discussion of which may be found in relation to FIG. 4.

In a further example, the profile service 108 may also employ a third-party verifier 126 to verify whether communication between the clients 102(n), 104(m) is permitted. For instance, the profile manager module 110 may intercept a VoIP communication that is intended for a child, e.g., client 104(m). The sender (e.g., client 102(n)) of the VoIP communication, however, may not be included in a profile 112(p) for the client 104(m) which indicates that communications from the client 102(n) are permitted. In such an instance, the profile manager module 110 may route the communication to a third-party verifier 126 before permitting the communication to be transmitted to the client 104(m). The third-party verifier 126 may be configured in a variety of ways, such as another one of the clients 104(m) that is a parent of the child, a third-party-web-based-verification service, an automated-third-party-verification service, and so on. Whether the VoIP is permitted to be communicated to the client 104(m) may then be based, at least in part, on a result of the verification. Further discussion of third-party verification may be found in relation to FIG. 5.

Although management of VoIP was described, the network 106 may also support a wide variety of other communication techniques. For example, the clients 102(n), 104(m) may communicate over the network 106 using email, instant messages, bulletin boards, discussion groups, and so on. Therefore, the management techniques may also be configured to address these other communication techniques to provide a unified management structure, further discussion of which may be found in relation to FIG. 4.

Additionally, although management of VoIP was described was being performed by the profile service 108, the client 104(m) may also manage VoIP and other communications. For example, the profile module 120(m), when executed, may provide similar functionality as that described for the profile manager module 128 of the profile service 108. A variety of other examples are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer-readable memory devices, further description of which may be found in relation to FIG. 2. The features of the VoIP management techniques described below are platform-independent, meaning that the techniques may be implemented on a variety of commercial computing platforms having a variety of processors.

Figure 2:
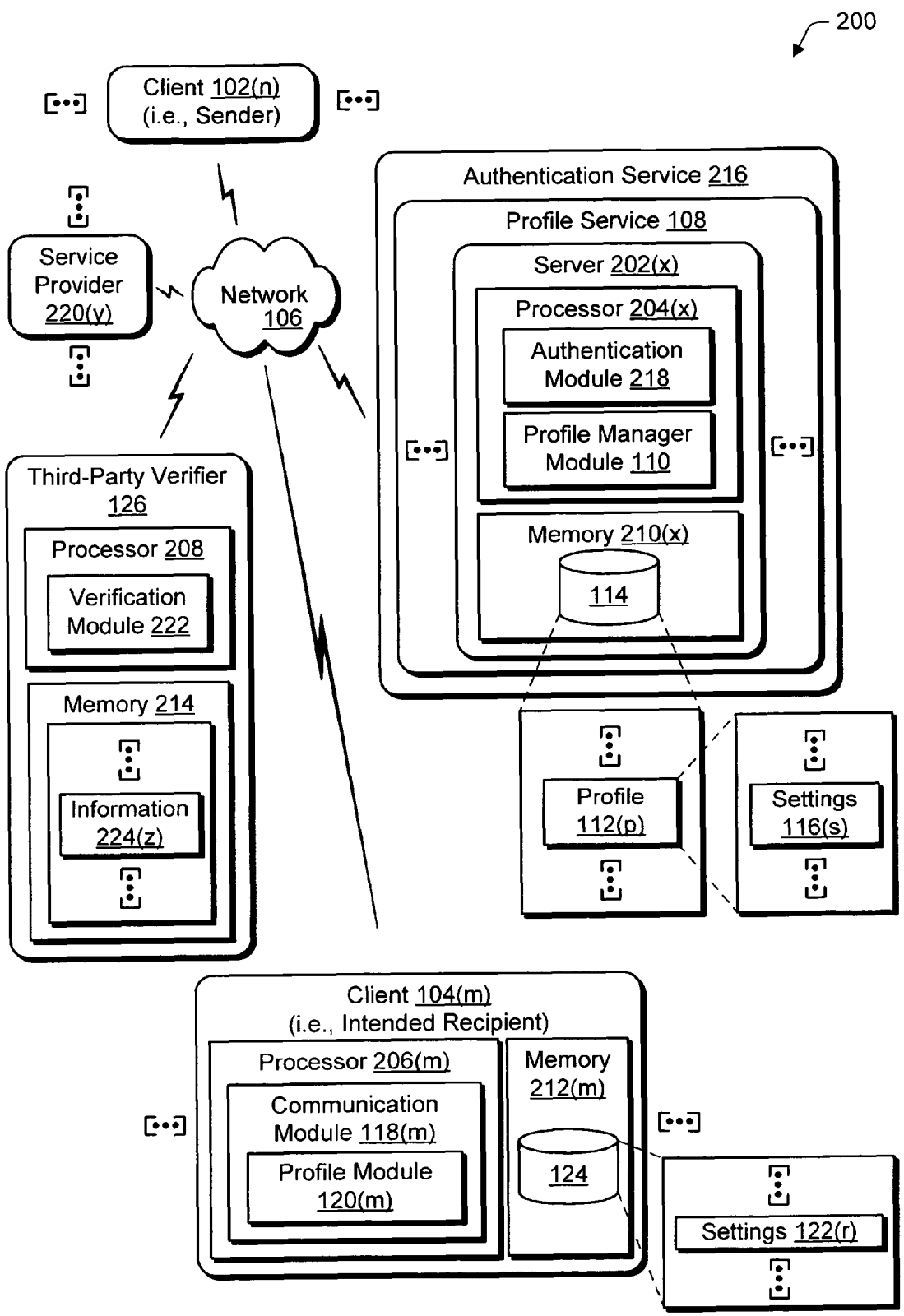
FIG. 2 is an illustration of a system in an exemplary implementation showing the clients, a profile service and a third-party verifier of FIG. 1 in greater detail.

FIG. 2 is an illustration of a system 200 in an exemplary implementation showing the clients 104(m), the profile service 108 and the third-party verifier 126 of FIG. 1 in greater detail. The profile service 108 is illustrated as being implemented by a plurality of servers 202(x), where "x" can be any integer from one to "X" and the third-party verifier 126 and the clients 104(m) are illustrated as devices. Thus, the servers 202(x), clients 104(m) and third-party verifier 126 each include a respective processor 204(x), 206(m), 208 and respective memory 210(x), 212(m), 214.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 210(x), 212(m), 214 is shown, respectively, for the servers 202(x), clients 104(n) and third-party verifier 126, a wide variety of types and combinations of memory may be employed, such as random access memory (RAM), hard disk memory, removable medium memory, and other types of computer-readable media.

The profile manager module 110 is illustrated as being executed on the processor 204(x) and is storable in memory 210(x). As previously described, the profile manager module 110 is representative of functionality that manages VoIP communication techniques as well as other communication techniques. The profile manager module 110, for instance, may utilize settings 116(s) specified in a profile 112(p) that corresponds to a particular user to manage how communication with the particular user is permitted. For instance, the settings 116(s) may specify a time of day (e.g., evening, between midnight and six am, and so on), particular days (e.g., weekends, holidays, and so on), number of conversations per day, length of conversations, and so forth.

A variety of actions may be performed based on the settings 116(s) when managing communications. For example, the profile manager module 110 may block a communication, pass a communication from one communication technique to another communication technique (e.g., pass a VoIP call to email), route (e.g., to the third-party verifier, voicemail, law enforcement in the case of harassment, and so on), provide a corresponding output based on an identity of the sender (e.g., a customized ring tone, a customized message to the sender, and so on), provide a "ringing" indication to the sender but not the recipient (e.g., when "after hours" for a child), notify and record particular conversations (e.g., work related conversations for later review), and so forth.

In the system 200 of FIG. 2, the profile service 108 is illustrated as incorporated within an authentication service 216. The authentication service 216 includes an authentication module 218 (which is illustrated as being executed on the processor 204(x) and is storable in memory 210(x)) that is representative of functionality that provides authentication services for a plurality of service providers 220(y), where "y" can be any integer from one to "Y".

For example, the service providers 220(y) (e.g., such as web sites, email providers, instant messaging systems, and so on) may "offload" authentication functionality to the authentication service 216. Therefore, once the client 104(m) is "signed-in" (i.e., logged on) to the authentication service 216, the client 104(m) may roam between service providers 220(y) without resubmitting sign-in credentials each time. By incorporating the profile service 108 with the authentication service 216, the profile manager module 110 may also manage communication of the client 104(m) with the service providers 220(y), such as permissible web sites and so on. Thus, a parent of a child may further manage interaction of the child using a single profile 112(p) without having to create a separate profile for each service provider 220(y), client device utilized by the child, and so on. Further discussion of the use of a profile 112(p) for multiple communication techniques may be found in relation to FIG. 4.

As previously described, the third-party verifier 126 may be implemented in a variety of ways. For example, the third-party verifier 126 may be a parent of a child, to which, unknown communications are first routed before delivery to the child. In the illustrated system 200 of FIG. 2, the third-party verifier 126 is implemented as a stand-alone-third-party verification service. The third-party verifier 126 includes a verification module 222 that is illustrated as being executed on the processor 208 and is storable in memory 214. The verification module 222, when executed, may provide a variety of functionality. For instance, the verification module 222 may provide a user interface which displays information relevant to a communication (e.g., a VoIP communication) that is to be communicated to a particular client 104(m), such as user name, originator, settings 116(s) specified by a parent for a child, and so on. An operator at the third-party verifier 126 may then query the sender (e.g., client 102(n)) to verify an identity of the sender and whether it is likely that the client 104(m) wishes/is permitted to receive communications from the sender. In another implementation, this determination may be performed automatically, such as through comparison with information 224(z) about the sender. A variety of other examples are also contemplated, further discussion of which may be found in relation to FIG. 5.

Exemplary Procedures

The following discussion describes VoIP management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
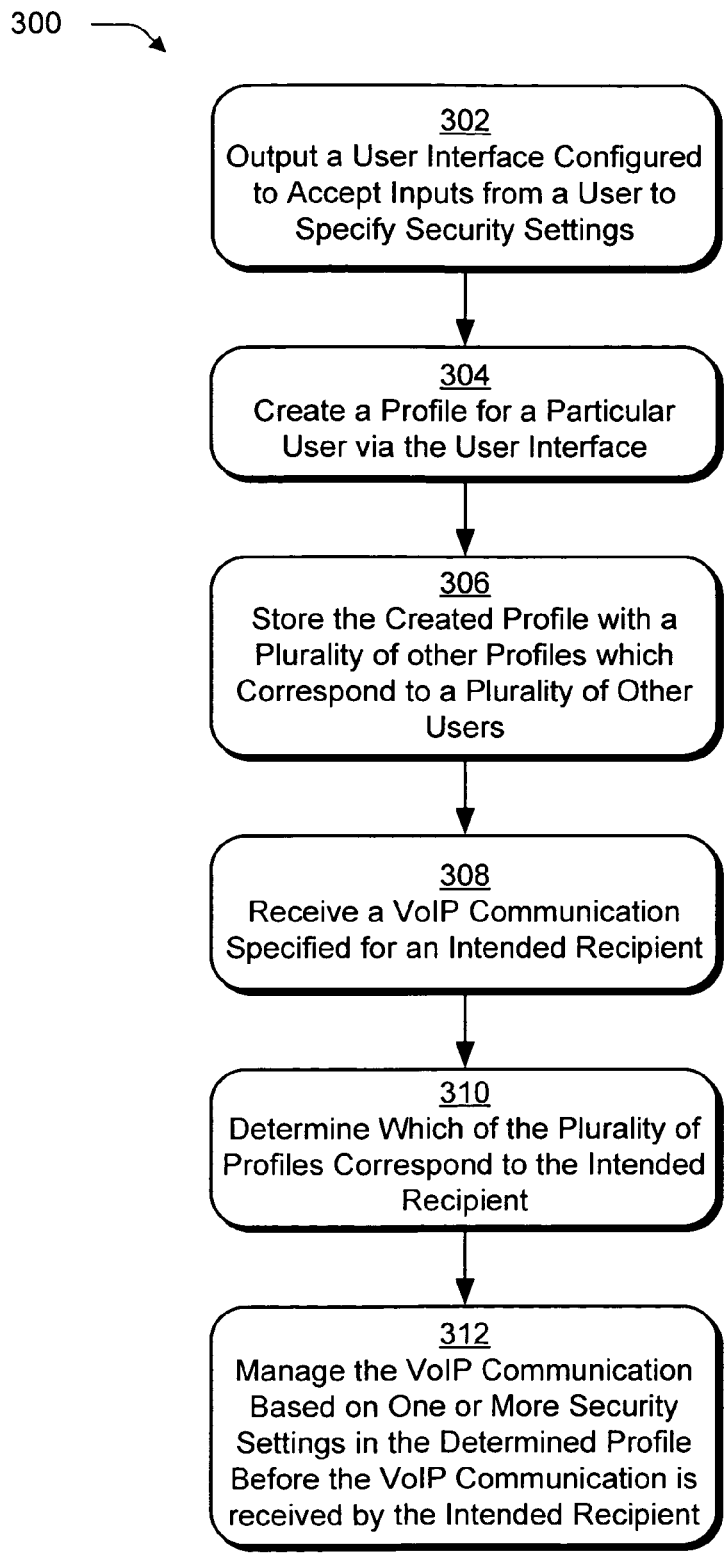
FIG. 3 is a flow diagram depicting a procedure in an exemplary implementation in which a profile is created and utilized to manage a VoIP communication.

FIG. 3 depicts a procedure 300 in an exemplary implementation in which a profile is created and utilized to manage a VoIP communication. A user interface is output that is configured to accept input from a user to specify security settings (block 302). For example, the user interface may include drop-down menus for different settings that are selectable to specify permissible and/or impermissible communication between a user and another user, particular times (e.g., during a day, day of a week, holiday, and so on) communication is permitted, permissible communication techniques that may be employed (e.g., email after 9 pm), and so forth. In this way, a profile may be created for a particular user via the user interface (block 304) which may then be stored with a plurality of other profiles that correspond to a plurality of other users (block 306). For example, the profile module 120(m) may communicate with the profile manager module 110 over the network 106 to create and store the profile 112(p) in storage 114.

A VoIP communication specified for an intended recipient is received (block 308) at the profile service 108. For example, the VoIP communication may specify a particular user, a group of users, and so on. The profile service 108 then determines which of the plurality of profiles 112(p) correspond to the intended recipient (block 310). For example, the profile manager module 110 may find and compare an identifier in a packet of a VoIP communication that specifies "where" the packet is to be communicated and use the identifier to locate a corresponding profile 112(p).

The VoIP communication is then managed based on one or more security settings in the determined profile before the VoIP communication is received by the intended recipient (block 312). The profile manager module 110, for instance, may determine to block the VoIP communication, route the VoIP communication to a third-party verifier, obtain a custom "ring tone" for output to the intended recipient, obtain a custom "back ring" tone for output to the sender (e.g., client 102(n)), reject the communication but provide a "ring" back to the client 102(n), route the communication to law enforcement, and so on.

Thus, a variety of functionality may be provided before the intended recipient even receives the VoIP communication, although in another implementation this functionality may be provided through execution of the profile module 120(m) locally on the client 104(m) as previously described. A variety of other management techniques may also be employed without departing from the spirit and scope thereof, further discussion of which may be found in relation to the following figures.

Figure 4:
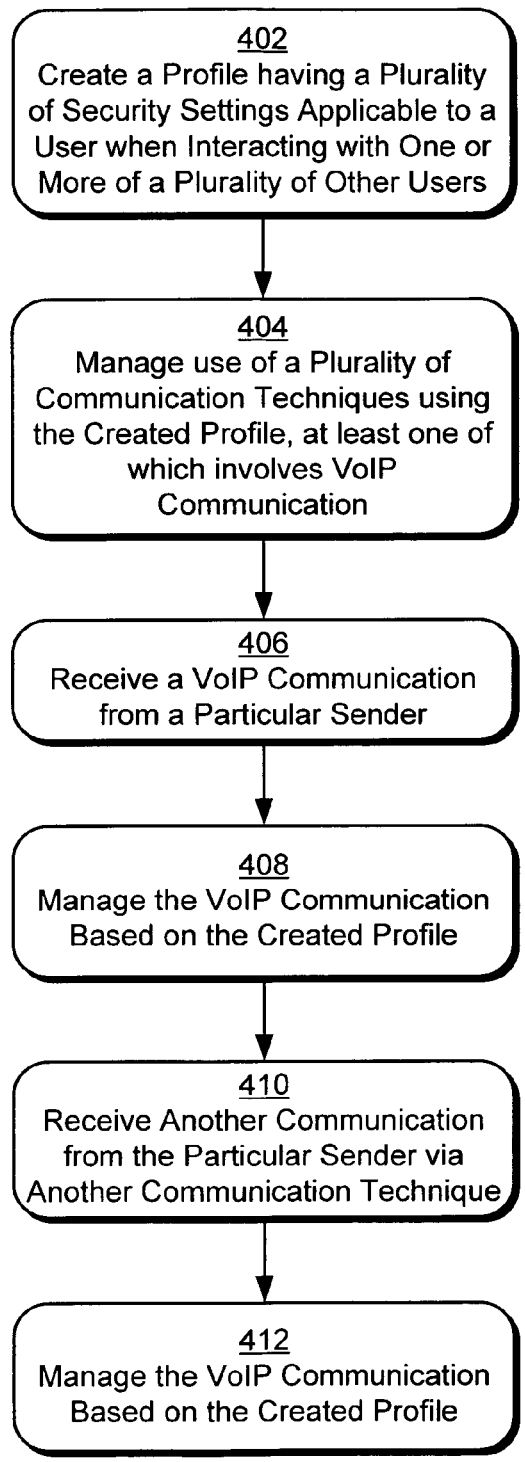
FIG. 4 is a flow diagram depicting a procedure in an exemplary implementation in which a profile is utilized to manage a plurality of communication techniques, at least one of which includes VoIP communication.

FIG. 4 depicts a procedure 400 in an exemplary implementation in which a profile is utilized to manage a plurality of communication techniques, at least one of which includes VoIP communication. As described in relation to FIG. 3, a profile is created having a plurality of security setting which is applicable to a user when interacting with one or more of a plurality of other users (block 402). For example, the profile may specify that communication with another particular client is prohibited at any time while communication with yet another particular client is permitted at certain times of day.

Use of a plurality of communication techniques is then managed using the created profile, at least one of which involves VoIP communication (block 404). For example, a VoIP communication may be received from a particular sender (block 406). The VoIP communication may then be managed based on the profile (block 408), such as blocked, routed, stored, selection of a corresponding message, and so on. For instance, the VoIP communication may be received from a friend of a child "after hours", i.e., after a period of time, during which, the child is permitted to received calls. Another communication may then be received from the particular sender via another communication technique (block 410), which is also managed based on the created profile (block 412).

For example, the friend may then send an email message to the child after the VoIP communication. Since the email message may be stored for later retrieval by the child, a parent which created the profile may permit such communication. Thus, in this example, the security settings may be different for a particular sender based on the communication technique utilized by the particular sender. A variety of other examples are also contemplated. For instance, a particular sender may be blocked no matter which communication technique is utilized to contact the intended recipient. Therefore, in this example although different communication techniques were not specified, the profile still provides a simplified and centralized mechanism through which a parent may help to control exposure of a child to undesirable communications. Although VoIP and email have been described as communication techniques in this example, the profile may be utilized to manage a variety of other communication techniques, such as access and postings to bulletin boards, web logs (i.e., blogs), instant messaging, and so on without departing from the spirit and scope thereof.

Figure 5:
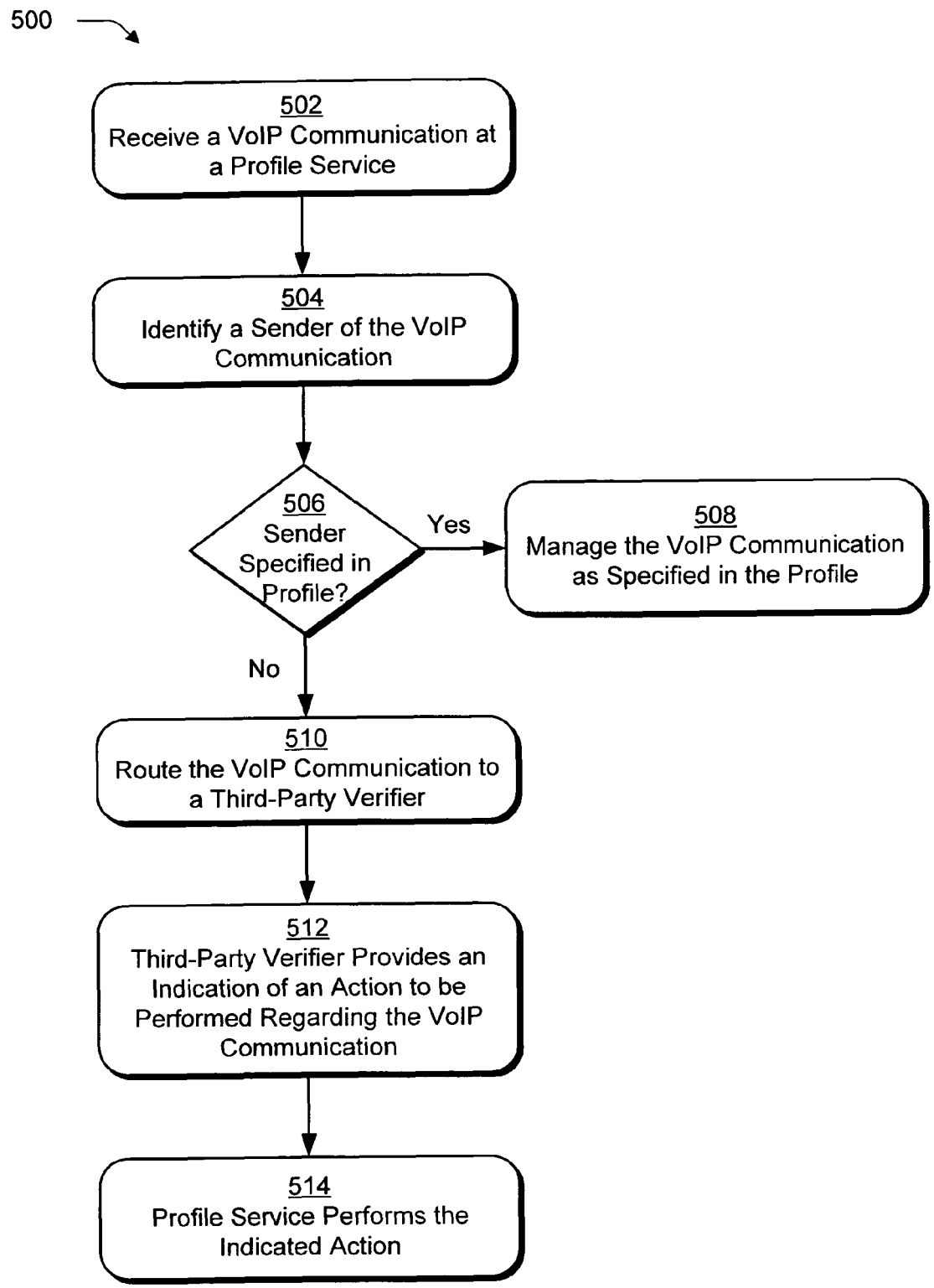
FIG. 5 is a flow diagram depicting a procedure in an exemplary implementation in which a VoIP communication specified for an intended recipient is first routed to a third-party verifier before receipt by the intended recipient.

FIG. 5 depicts a procedure 500 in an exemplary implementation in which a VoIP communication specified for an intended recipient is first routed to a third-party verifier before receipt by the intended recipient. A VoIP communication is received at a profile service (block 502). For example, a VoIP communication sent by the client 102(n) and specified for client 104(m) may be received by a profile service 108 that is configured as a stand-alone service. A sender of the VoIP communication is then identified (block 504). For instance, the profile manager module 110, when executed, may query the profiles 112(p) to find a profile which corresponds to the intended recipient, e.g., client 104(m).

A determination is then made as to whether the sender is specified in the profile (decision block 506). If so ("yes" from decision block 506), the VoIP communication is managed as specified in the profile (block 508), such as routed, blocked, stored, and so on.

If the sender is not specified in the profile ("no" from decision block 506), the VoIP communication is routed to a third-part verifier (block 510). For example, the VoIP communication may be routed from the profile service 108 to a third-party verifier 126 over the network 106. As previously described the third-party verifier may be implemented in a variety of ways, such as a parent of the client 104(m), a stand-alone service that uses operators to verify the communication, an automated stand-alone service the executes the verification module 222 to verify the communication, and so on.

The third-party verifier then provides an indication of an action to be performed regarding the VoIP communication (block 512) and the profile service performs the indicated action (block 514). For example, the information 224(z) may specify that the client 102(n) is untrustworthy and therefore the indication may state that the communication from the client 102(n) should be blocked. The profile service 108 may then block the communication. In another instance, an operator of the third-party verifier 126 may ask questions of the client 102(n), such as where they know the client 104(m) from, and so on. The operator may then determine whether the sender (e.g., client 102(n)) is trustworthy and provide a result of this determination to the profile service 108 for further processing. This determination may also be automated through execution of the verification module 222, such as to provide questions and analyze answers to the questions provided by the client 102(n). A variety of other examples are also contemplated without departing from the spirit and scope thereof.

Figure 6:
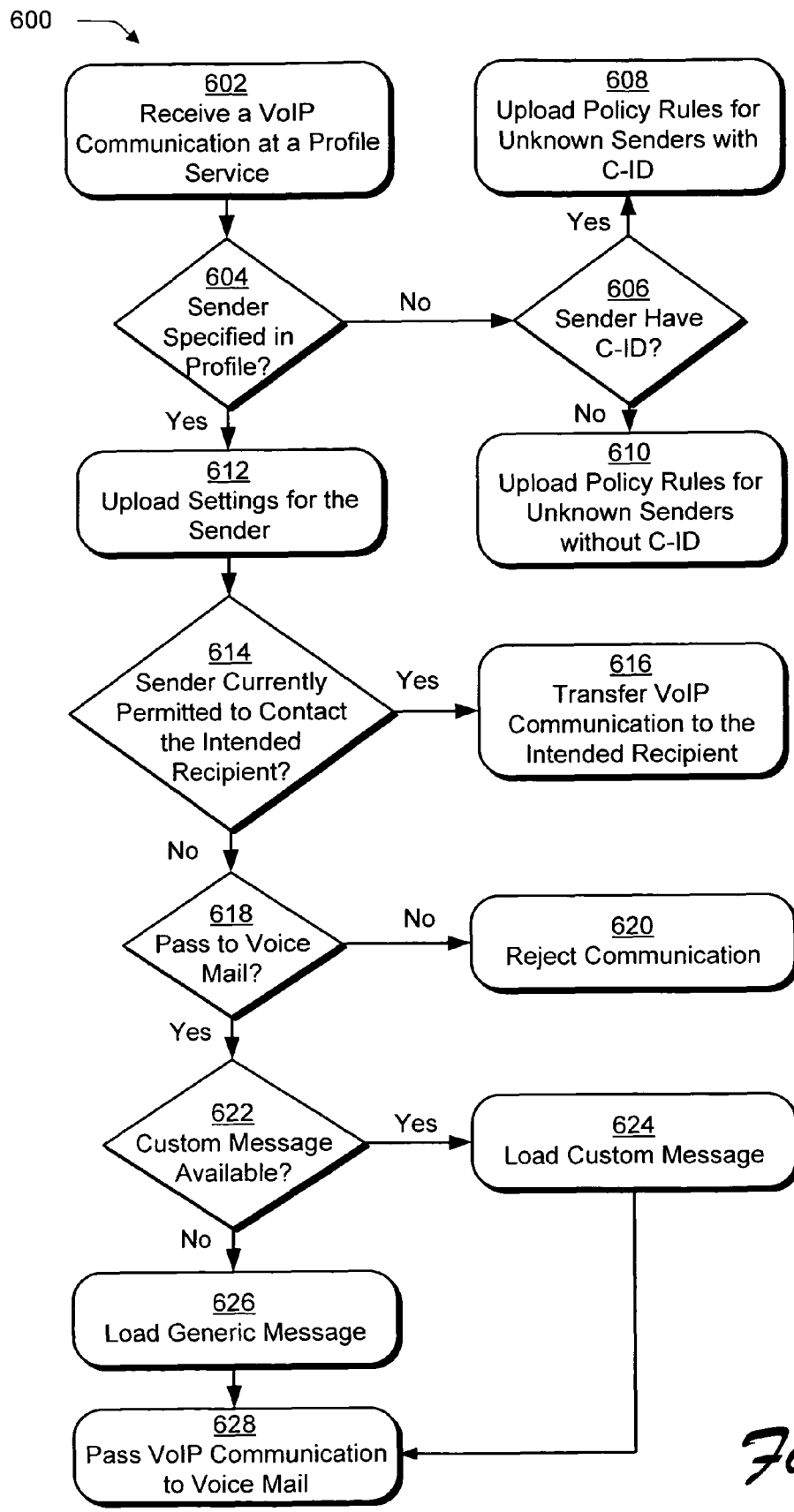
FIG. 6 is a flow diagram depicting a procedure in an exemplary implementation in which a variety of management techniques are employed to manage a VoIP communication.

FIG. 6 depicts a procedure 600 in an exemplary implementation in which a variety of different management techniques are employed to manage a VoIP communication. A VoIP communication is received at a profile service (block 602). A determination is then made as to whether a sender of the VoIP communication is specified in a profile (decision block 604).

If not ("no" from decision block 604), a determination is made as to whether the sender has caller ID (C-ID) (decision block 606). Policy rules for unknown sender with C-ID (block 608) or policy rules for unknown sender without C-ID (block 610) are uploaded, when appropriate (i.e., "yes" or "no" from decision block 606).

When the sender is specified in the profile ("yes" from decision block 604), settings for the sender are uploaded (block 612). For example, the profile manager module 110 may find an identifier that corresponds to the sender and upload settings that are particular to that sender. A determination is then made as to whether the sender is currently permitted to contact the intended recipient (decision block 614). If so ("yes" from decision block 614), the VoIP communication is transferred to the intended recipient (block 616). If not ("no" from decision block 614), a determination is made as to whether the communication is to be passed to voice mail (decision block 618).

When the communication is not to be passed to voice mail ("no" from decision block 618), the communication is rejected (block 620). For example, the sender may be a malicious party and therefore contact with the sender may be blocked completely. In another example, the communication may be routed to law enforcement automatically without the intended recipient even receiving the communication.

When the communication is to be passed to voice mail ("yes" from decision block 618), a determination is made as to whether a custom message is available (decision block 622). If so ("yes" from decision block 622), the custom message is loaded (block 624) and if not ("no" from decision block 622) a generic message is loaded (block 626). The VoIP communication is then passed to voice mail (block 628 from block 624 or 626). Although a variety of management techniques arranged in an exemplary order have been described, it should be readily apparent that a variety of other techniques and orders are also contemplated without departing from the spirit and scope thereof.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   creating a user profile based on security settings providing safety measures;
   receiving a Voice over Internet Protocol (VoIP) communication specified for an intended recipient available via a network address;
   determining that the user profile corresponds to the intended recipient of the VoIP communication; and
   managing the VoIP communication based on the security settings specified in the user profile, wherein the managing further comprises:
     routing the VoIP communication to a third-party verifier available via another network address that is different from the network address of the intended recipient; and
     routing the VoIP communication as specified by the third-party verifier.

2. A method as described in claim 1, wherein the security settings specify:
   a plurality of contacts in a contact list who are permitted to communicate with the intended recipient;
   an amount of time that the intended recipient is permitted to spend communicating with one or more contacts in the contact list; and
   a time of day, during which, communication with one or more contacts in the contact list is permissible.

3. A method as described in claim 1, wherein:
   the determining further comprises:
     finding an identifier of the intended recipient in at least one packet of the Voice over Internet Protocol (VoIP) communication; and
     locating the user profile which corresponds to the identifier; and
   the managing further comprises managing each packet having the identifier according to the user profile.

4. A method as described in claim 1, wherein the third-party verifier includes one or more additional security settings that are utilized to automatically manage the Voice over Internet Protocol (VoIP) communication.

5. A method comprising:
   creating a profile that specifies security settings for a user when interacting with one or more of a plurality of other users;
   receiving a Voice over Internet Protocol (VoIP) communication;
   identifying a sender of the VoIP communication;
   determining whether the sender is specified in one of a plurality of profiles;
   in an event, the sender is specified in a determined profile:
     managing the received VoIP communication using the determined profile;
   in an event, the sender is not specified in a determined profile:
     routing the VoIP communication to a third-party verifier; and
     utilizing the third-party verifier to perform an action based on one or more additional security settings.

6. A method as described in claim 5, wherein the action comprises passing the VoIP communication to a different communication technique, wherein the different communication technique includes email or instant messaging.

7. A method as described in claim 5, wherein the managing includes authenticating the sender when attempting access to one of a plurality of service providers over a network, the authenticating permitting the sender to roam between the plurality of service providers and a plurality of client devices without resubmitting sign-in credentials.

8. One or more computer readable storage media comprising computer executable instructions that, when executed, direct a computer to:
   download a profile over a network, the profile specifying security settings indicating safety measures for a user when communicating with one or more of a plurality of other users, the security settings being provided by someone other than the user and the plurality of other users;
   receive a Voice over Internet Protocol (VoIP) communication from the user; and
   manage the VoIP communication using the profile specifying the security settings, wherein management of the VoIP communication through execution of the computer-executable instructions further includes:
     routing the VoIP communication to a third-party verifier available via a network address that is different from another network address, at which, the user is available; and
     performing an action regarding the VoIP communication as specified by the third-party verifier.

9. A method as described in claim 5, wherein the security settings specify:
- a plurality of contacts in a contact list who are permitted to communicate with the user;
- an amount of time that the user is permitted to spend communicating with one or more contacts in the contact list; and
- a time of day, during which, communication with one or more contacts in the contact list is permissible.

10. One or more computer readable storage media as described in claim 8, wherein the security settings specify:
- a plurality of contacts in a contact list who are permitted to communicate with the user;
- an amount of time that the user is permitted to spend communicating with one or more contacts in the contact list; and
- a time of day, during which, communication with one or more contacts in the contact list is permissible.

11. A method as described in claim 1, wherein the security settings independently address a plurality of communication techniques.

12. A method as described in claim 1, wherein the user profile is configured to manage, via a logon identifier authenticated by an authentication service, the intended recipient across a plurality of different service providers.

13. A method as described in claim 1, wherein the security settings are provided by someone other than the intended recipient.

14. A method as described in claim 5, wherein the security settings independently address a plurality of communication techniques.

15. A method as described in claim 5, wherein the profile specifying the sender is configured to manage, via a logon identifier authenticated by an authentication service, the sender across a plurality of different service providers.

16. A method as described in claim 5, wherein the security settings are provided by someone other than the sender.

\* \* \* \* \*